United States Patent

Müller

[11] 3,939,370
[45] Feb. 17, 1976

[54] VARIABLE SPEED THREE-PHASE MOTOR

[76] Inventor: Arnold Müller, Lichtensteinstrasse 31, 7312 Kirchheim, Teck, Germany

[22] Filed: June 18, 1974

[21] Appl. No.: 480,426

[30] Foreign Application Priority Data
June 28, 1973 Germany............................ 2332868

[52] U.S. Cl. ............... 310/125; 310/126; 310/166; 318/234; 318/243
[51] Int. Cl.² ...................................... H02K 17/16
[58] Field of Search ........... 310/124, 125, 126, 166, 310/67, 59, 112, 114, 42; 318/234, 243

[56] References Cited
UNITED STATES PATENTS

| | | |
|---|---|---|
| 1,174,654 | 3/1916 | Bergman ........................ 310/166 X |
| 1,767,135 | 6/1930 | Janca ............................... 318/234 X |
| 2,296,776 | 9/1942 | Douglas ........................... 310/212 X |
| 2,864,017 | 12/1958 | Wahscheff ........................... 310/126 |
| 3,209,184 | 9/1965 | Woodward, Jr. ................. 310/59 X |
| 3,254,288 | 5/1966 | Hutson.............................. 318/243 |
| 3,445,699 | 5/1969 | Beaudry et al...................... 310/125 |
| 3,749,949 | 7/1973 | Müller ............................... 310/114 |

*Primary Examiner*—Donovan F. Duggan
*Attorney, Agent, or Firm*—Joseph A. Geiger

[57] ABSTRACT

The disclosure is of a variable speed three-phase motor with a intermediate rotor and inner rotor, where the pack of laminations of the main rotor is prolonged as an annular pack of laminations in the direction of the longitudinal axis with short-circuit rods extending over the whole length of the stator, thereby forming an annular intermediate rotor inside which the inner rotor with its short-circuit rods rotates.

3 Claims, 5 Drawing Figures

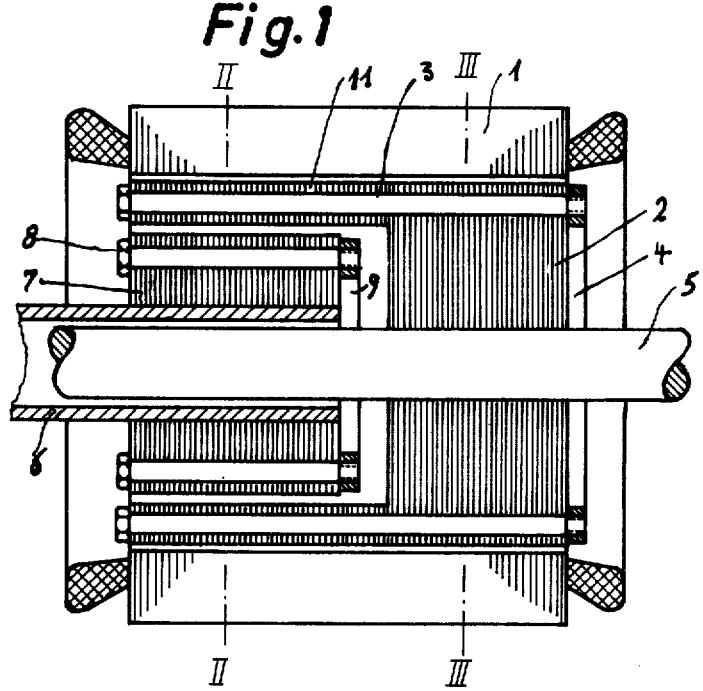
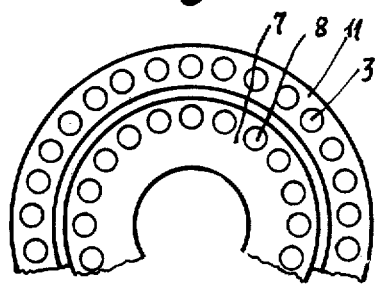
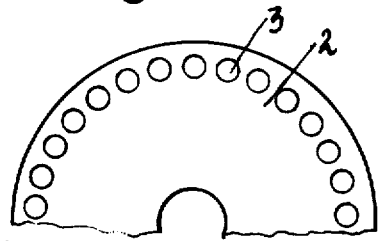
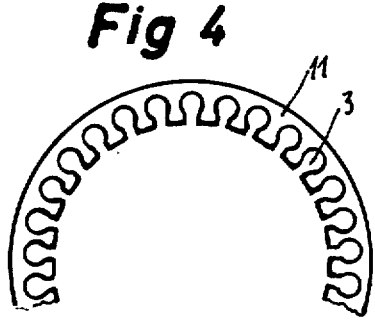
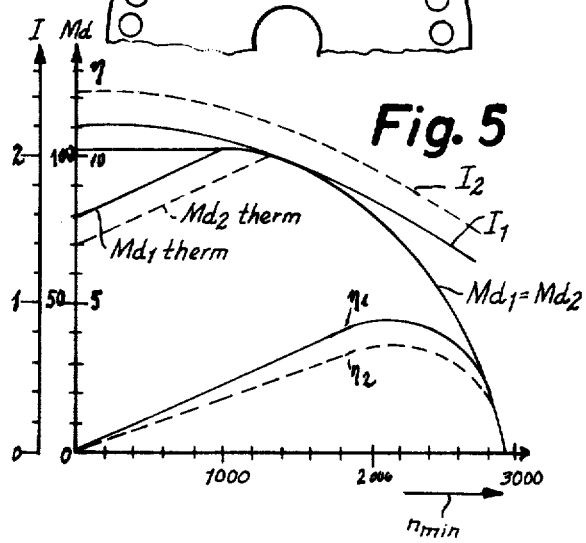

3,939,370

VARIABLE SPEED THREE-PHASE MOTOR

BACKGROUND OF THE INVENTION

1. Field of the Invention

The invention relates to variable speed three-phase motors with intermediate rotor and inner rotor, and to a method for the production of the lamination packs of such three-phase motors.

2. Description of the Prior Art

A known variable speed three-phase motor of this kind features as intermediate rotor a non-magnetic metallic sleeve which is connected with the short-circuit rods of the main rotor or directly keyed to the drive output shaft. Such a motor is disclosed in my U.S. Pat. No. 3,749,949. This type of motor, however, has the disadvantage that eddy currents in the intermediate rotor lead to a buildup of heat in the three-phase motor, through which its maximum power output is limited.

SUMMARY OF THE INVENTION

In order to avoid these and other disadvantages, the invention suggests that the pack of laminations of the main rotor be extended axially as an annular pack of laminations with short-circuit rods extending through it over a length equal to the length of the stator, so that an annular intermediate rotor is formed inside which an inner rotor with short-circuit rods rotates. In the method in accordance with the invention the lamination packs for such three-phase motors are obtained in such a way that a part of the lamination pack for the main rotor is stamped out to form the lamination pack for the inner rotor and the annular part of the lamination pack which remains extends from the main rotor to serve as an intermediate rotor.

The invention solves the problem of substantially improving a three-phase motor of the initially mentioned kind in a simple manner, of simplifying its production and of considerably improving its torque in all rotation speed ranges, or in the case of equal torque requirements, of substantially and favorably changing the other data, such as current consumption, efficiency and thermal behaviour, in comparison with other motors.

Some examples of the object of the invention are illustrated diagrammatically in the accompanying drawing.

BRIEF DESCRIPTION OF THE DRAWING

In the drawing:

FIG. 1 shows a schematically simplified longitudinal section through the stator and the rotating parts of a three-phase motor, without its housing bearing plates, and ventilator;

FIG. 2 shows typical rotor laminations in plan II in FIG. 1,

FIG. 3 shows a typical rotor laminations in plan III in FIG. 1,

FIG. 4 shows a possible modification of the outer lamination of FIG. 2

FIG. 5 shows a performance graph of the motor in comparison with prior art three-phase motors.

DESCRIPTION OF THE PREFERRED EMBODIMENTS

According to FIG. 1, the main rotor 2, mounted on the drive output shaft 5, rotates inside the stator 1. The main rotor 2 has attached thereto an axial extension serve as an intermediate rotor 11, continuous short-circuit rods 3 extending through both rotors in slots or bores 3, which rods are connected on both sides with short-circuit rings 4 (the left-hand short-circuit rings 4 are not shown for the sake of clarity of the drawing). Inside the hollow intermediate rotor 11, that is to say also inside the stator 1, is arranged on inner rotor 7 which is seated on the hollow shaft 6 which is coaxially arranged with the the output shaft 5 and in general drives the ventilating impeller of the three-phase motor. The inner rotor 7 has conventional short-circuit rods 8 in its slots which are connected with short-circuit rings 9 on both end (shown on only one side of the rotor).

FIG. 2 shows typical rotor laminations of such a motor with the lamination of the intermediate rotor 11 having bores for the short-circuit rods 3. The inner rotor 7 has similar short-circuit rods 8 extending through bores in its laminations. In FIG. 3 the laminations of the main rotor 2 accommodate the short-circuit rods 3 in the same bores as those that extend through the intermediate rotor 11.

FIG. 4 shows a modification of the laminations of FIG. 2, the bores for the short-circuit rods 3 having been replaced with inwardly opening slots.

The lamination pack of the main rotor 2, which in known variable speed motors extends only over a part of the length of the stator 1, is extended with its short-circuit rods 3 to the entire length of the stator 1, this axial extension being annular and constituting the intermediate rotor 11. Thus the latter can be stamped out of the same lamination blanks as the main rotor 2, the stamped-out parts being used as laminations for the inner rotor 7 and accommodating in their apertures short-circuit rods 8. Thus a part of the lamination pack for the main rotor 2 is stamped out to form the lamination pack for the inner rotor 7. The remaining annular part of the lamination pack of the main rotor 2 thus thus becomes thus the annular intermediate rotor 11.

In the performance graph according to FIG. 5, two three-phase motors with equal torques M$d$ are compared with one another, the dotted lines of the known embodiment showing its current consumption $I_2$, its efficiency $\eta_2$ and the thermal torque $MD_2$ for continuous operation. The solid lines are corresponding plots of a motor according to the invention with equal torque M$d$ and the parameters $I_1$, $\eta_1$ and M$d_1$ for its thermal behaviour.

From this its appears that in comparison with the known embodiment with its non-magnetic intermediate rotor, the current consumption is substantially lower, the efficiency is substantially improved and the thermal response to load lies substantially more favourably. This is achieved through the particular structure of the variable speed three-phase motor according to the invention in a simple manner, so that a decisively improved response is guaranteed by the advantages thus given and by the characteristics of the three-phase motor.

What is claimed is:

1. A variable speed three-phase short-circuit motor comprising:

a central drive output shaft defining the longitudinal axis of the motor;

a main rotor of the short-circuit cage type, fixedly mounted on the output shaft for rotation therewith;

a hollow intermediate rotor axially adjoining the main rotor as an extension of its short-circuit cage, thereby forming a continuous outer rotor surface therewith, the intermediate rotor being thus solidary with the main rotor and disposed coaxially with respect to the output shaft to form a cavity that is concentric with respect to the motor axis;

an inner short-circuit rotor arranged inside said cavity so as to cooperate with the surrounding intermediate rotor;

a secondary shaft arranged coaxially with the drive output shaft on the side of the intermediate rotor and inner rotor, said secondary shaft carrying the inner rotor for rotation independent of the drive output shaft; and a stator surrounding both the main rotor and the intermediate rotor for dynamoelectric cooperation therewith.

2. A motor as defined in claim 1, wherein:

the main rotor has a body composed of a pack of disc-shaped laminations; and both the intermediate rotor and the inner rotor have bodies similarly composed of packs of laminations, the laminations of the inner rotor being stamped-out portions of the laminations of the intermediate rotor.

3. A motor as defined in claim 1, wherein the main rotor and the intermediate rotor have a common cylindrical outer surface and include a series of short-circuit rods extending axially through both rotors.

* * * * *